(12) United States Patent
Jung et al.

(10) Patent No.: US 7,672,670 B2
(45) Date of Patent: Mar. 2, 2010

(54) METHOD AND SYSTEM FOR PROVIDING STATUS INFORMATION FOR BROADCAST/MULTICAST SERVICE IN A MOBILE COMMUNICATION SYSTEM

(75) Inventors: Jung-Soo Jung, Seoul (KR); Beom-Sik Bae, Suwon-si (KR); Dae-Gyun Kim, Seongnam-si (KR); Yong Chang, Seongnam-si (KR); Jun-Hyuk Song, Anyang-si (KR); Nae-Hyun Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1567 days.

(21) Appl. No.: 10/958,088

(22) Filed: Sep. 16, 2004

(65) Prior Publication Data

US 2005/0111394 A1    May 26, 2005

(30) Foreign Application Priority Data

Sep. 16, 2003    (KR) .................... 10-2003-0064101

(51) Int. Cl.
*G06F 15/16*    (2006.01)
(52) U.S. Cl. .................................. 455/435.1; 370/254
(58) Field of Classification Search ............... 370/329, 370/335, 390, 392, 254; 455/435.1
See application file for complete search history.

(56) References Cited

U.S. PATENT DOCUMENTS

| 7,075,971 B2* | 7/2006 | Parsa et al. ................. 375/141 |
| 2004/0095897 A1* | 5/2004 | Vafaei ....................... 370/254 |

FOREIGN PATENT DOCUMENTS

| CN | 1839650 | 9/2006 |
| JP | 2001-217769 | 8/2001 |
| JP | 2001-298408 | 10/2001 |
| JP | 2001-308856 | 11/2001 |
| JP | 2002-171548 | 6/2002 |
| JP | 2002-290356 | 10/2002 |
| JP | 2003-186774 | 7/2003 |
| WO | WO 02/080588 | 10/2002 |

* cited by examiner

*Primary Examiner*—Sam Bhattacharya
(74) *Attorney, Agent, or Firm*—The Farrell Law Firm, LLP

(57) ABSTRACT

In response to a BCMCS service request from a mobile station, a base station separately informs the mobile station whether the requested BCMCS service is available. Thus, the base station can include only broadcast channel information necessary for actual broadcast in a broadcasting overhead message, and if the BCMCS service is stopped or unavailable, the base station can order the mobile station to interrupt the BCMCS service, thereby reducing the load on system resources.

23 Claims, 11 Drawing Sheets

METHOD AND SYSTEM FOR PROVIDING STATUS INFORMATION FOR BROADCAST/MULTICAST SERVICE IN A MOBILE COMMUNICATION SYSTEM

PRIORITY

This application claims priority under 35 U.S.C. §119 to an application entitled "Method and System for Providing Status Information for Broadcast/Multicast Service in a Mobile Communication System" filed in the Korean Intellectual Property Office on Sep. 16, 2003 and assigned Serial No. 2003-64101, the contents of which are incorporated herein by reference.

BACKGROUND OF THE INVENTION

1. Field of the Invention

The present invention relates generally to a Broadcast/Multicast Service (BCMCS) method and system in a mobile communication system, and in particular, to a BCMCS method and system for providing a mobile station with various status information indicating whether a BCMCS service is available and whether a BCMCS service is stopped due to a system abnormality within a broadcasting network.

2. Description of the Related Art

A broadcasting overhead message used in the conventional BCMCS system must include identification information (hereinafter referred to as a "BCMCS Flow ID") for all available BCMCS content regardless of whether a service is actually in progress in each cell when Dynamic BCMCS is used. The broadcasting overhead message can be classified into Broadcast System Parameters Message (BSPM) used in a 1x BCMCS system and Broadcast Overhead Message used in a High-Rate Packet Data (HRPD) BCMCS system.

In the following description, the "1x BCMCS system" refers to a BCMCS system based on CDMA 2000 1x Rev.A/B or 1x EV-DV (Evolution Data and Voice), i.e., CDMA 2000 1x Rev.C/D, and the "HRPD BCMCS system" refers to a BCMCS system based on 1x EV-DO (Evolution Data Only).

If a desired BCMCS Flow ID is included in the broadcasting overhead message, a mobile station (or access terminal) determines that it can receive a corresponding BCMCS service, and transmits a Broadcast Registration message to a base station (or access network). The mobile station determines whether it can receive a BCMCS service using the BCMCS Flow ID because there are no other methods capable of informing a mobile station whether it can receive a BCMCS service, excepting the broadcasting overhead message.

The HRPD BCMCS system uses a Broadcast Reset message. For example, the Broadcast Reset message is transmitted to an access terminal when broadcasting-related session information is changed in a broadcasting network and when the access terminal moves to a cell where its previous broadcasting-related session information is invalid.

In the HRPD BCMCS system, negotiation on configuration information of protocols should be made while carrying out configuration negotiation for Unicast Service or immediately after a traffic channel is set up to access a BCMCS controller in order to receive a BCMCS service. While a BCMCS service is being provided, because the access terminal operates in an idle status, configuration negotiation over broadcast protocols is not performed.

As described above, in the conventional BCMCS system, because only the broadcasting overhead message can be used for informing a mobile station of the availability of a BCMCS service, each cell must include information on all available broadcast channels in order to provide Dynamic BCMCS, causing an increase in the length of the broadcasting overhead message. The increase in length of the broadcasting overhead message inevitably increases loads on a paging-related channel in the 1x BCMCS system and a control channel in the HRPD BCMCS system.

Additionally, when a BCMCS service is stopped due to a system failure or mobile station failure(s), the conventional BCMCS system has no way to inform a mobile station of the failure(s). For these reasons, the conventional BCMCS system must depend on reception performance of a mobile station or recognition of a user of the mobile station in determining whether a BCMCS service can be normally received.

Further, when using the Broadcast Reset message the BCMCS system must perform a process in which the access terminal sets up a traffic channel and accesses the BCMCS controller. In this method the time required for user recognition to occur is greatly increased, thereby inconveniencing the user. Further, even in the state where a BCMCS service is unavailable, a BCMCS-related message is transmitted to the access terminal and a traffic channel is set up unnecessarily, wasting system resources.

In the HRPD BCMCS system, an access terminal performs configuration attribute negotiation for each protocol only when it transmits traffic, i.e., only when it performs data communication. In an idle status where the access terminal does not perform data communication, because there is no way to negotiate an attribute value and the access terminal has not performed negotiation with an access network over a configuration attribute of a broadcast protocol, the access terminal cannot receive a BCMCS service. In contrast, an access terminal that has performed attribute negotiation by performing data communication can receive a BCMCS service. That is, while receiving a BCMCS service, although the access terminal stays in an idle status for data traffic other than that for a BCMCS service, the access terminal can receive broadcast traffic using information on a configuration attribute, which was acquired through previous negotiation.

In some cases, an access terminal receiving a BCMCS service through the session negotiation needs to perform a new negotiation over an attribute value while receiving broadcast traffic. However, because negotiation over an attribute value should be made through only a traffic channel, an access terminal currently receiving broadcast traffic cannot perform a negotiation with an access network over an attribute of a new configuration value. In this case, because the access terminal cannot perform a negotiation over an attribute of a configuration value, when it is necessary to change the attribute of a configuration value, a normal BCMCS service may not be achieved.

Access terminals have different update points for an attribute of a configuration value. Because the update for an attribute of a configuration value is restrictively performed according to data traffic, a particular access terminal may not continuously update session information. In this case, an access network providing a BCMCS service may experience difficulty in managing the BCMCS service.

As described above, in the conventional BCMCS system, a broadcasting overhead message used to transmit BCMCS-related wireless information such as BSPM to a mobile station is undesirably large. Additionally, when a BCMCS service is abruptly stopped due to a failure of a broadcasting network or a BCMCS server, or due to a lack of wired and/or wireless resources for transmitting broadcast traffic, there is no way to inform the mobile station of the status.

SUMMARY OF THE INVENTION

It is, therefore, an object of the present invention to provide a Broadcast/Multicast Service (BCMCS) method and system for reducing overhead of BCMCS information transmitted to a mobile station in a wireless section of a mobile communication system providing a BCMCS service.

It is another object of the present invention to provide a BCMCS method and system for reducing the waste of wired and/or wireless information resources due to the unnecessary transmission of a BCMCS-related message or setup of a traffic channel by transmitting information on a broadcasting status to a user.

To achieve the above and other objects, there is provided a method for providing information on a status of a broadcasting network from a base station to a mobile station in a mobile communication system providing at least one BCMCS. In the method, the base station detects a change in status of the broadcasting network and transmits a broadcast order message that includes information indicating the change in status of the broadcasting network, to the mobile station. The mobile station then recognizes the change in status of the broadcasting network.

To achieve the above and other objects of the present invention, there is provided a mobile communication system for providing information on a status of a broadcasting network from a base station to a mobile station while providing a BCMCS. The base station transmits a broadcast order message including information indicating a change in status of the broadcasting network to the mobile station, upon detecting the change in status of the broadcasting network. The mobile station receives the broadcast order message while using a BCMCS service, and recognizes the change in the status of the broadcasting network.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the following description, a detailed description of known functions and configurations incorporated herein has been omitted for conciseness.

In the following description, a mobile communication system according to a first embodiment of the present invention corresponds to an HRPD BCMCS system, and for convenience, the HRPD BCMCS will be applied to a 1x EV-DO system. In addition, a mobile communication system according to a second embodiment of the present invention is applied to other high-speed packet data systems such as CDMA 2000 1x and 1x EV-DV systems.

Figure 1:
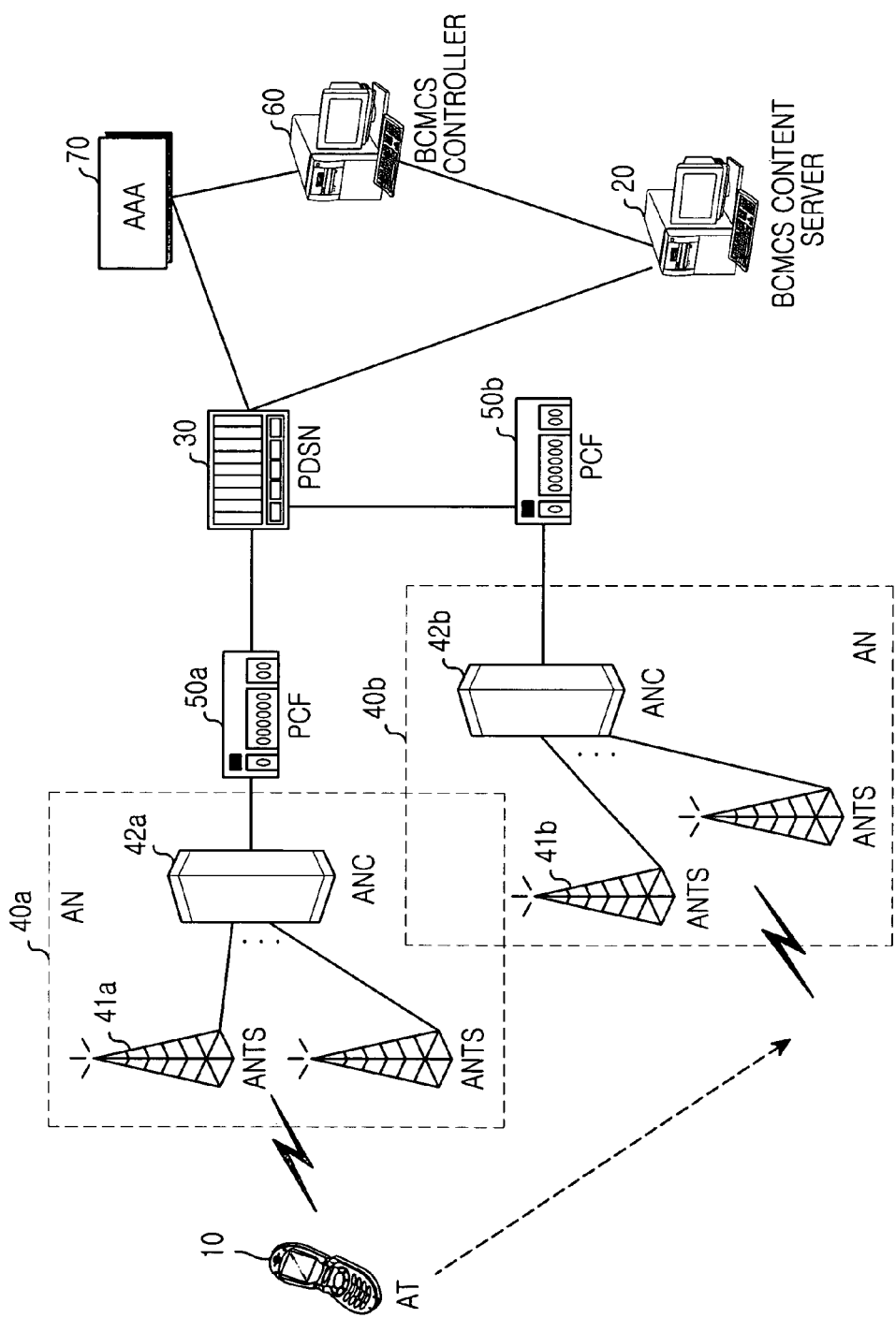
FIG. 1 is a diagram illustrating a structure of an HRPD BCMCS mobile communication system according to a first embodiment of the present invention.

FIG. 1 is a diagram illustrating a structure of an HRPD BCMCS mobile communication system, or a 1x EV-DO-based BCMCS system, according to a first embodiment of the present invention. Referring to FIG. 1, a BCMCS system is defamed as a broadcasting network that provides a BCMCS service through wireless communication with a plurality of access terminals (ATs) 10. The broadcasting network can be roughly divided into a broadcasting service server or contents server (BCMCS content server) 20, a packet data service node (PDSN) 30, access networks (ANs) 40a and 40b, and a BCMCS controller 60.

The BCMCS content server 20 generates broadcast data including video and sound for a BCMCS service in the form of a compressed Internet Protocol (IP) packet. The generated IP packet is forwarded to the access networks 40 (40a and 40b) via the packet data service node 30 through a packet communication network such as the Internet.

The access networks 40 include access network transceiver systems (ANTSs) 41a and 41b and access network controllers (ANCs) 42a and 42b, all of which are well known in the field of mobile communication technology, and packet control functions (PCFs) 50a and 50b are interconnected between the access networks 40 and the packet data service node (PDSN) 30. The PDSN 30 interworks with an Authentication, Authorization and Accounting (AAA) server 70 for controlling accounting and broadcast authentication, and the BCMCS controller 60 is interconnected between the AAA server 70 and the BCMCS content server 20.

The HRPD BCMCS system according to the present invention uses Broadcast Order Message (BOM), which is defined by extending a function of the existing Broadcast Reset Message (BRM), for a BCMCS service.

The "Broadcast Order Message," a message defined in the present invention, is used to inform the access terminal 10 of a status of the broadcasting network, and the access terminal 10 performs an appropriate operation according to the status. Information on the current status of the broadcasting network, transmitted to the access terminal 10, includes BCMCS Parameter Reset information, BCMCS Stop information, BCMCS Unavailable information, and Broadcast Protocol Attribute Update information. The above information will be described in detail herein below.

1) BCMCS Parameter Reset Information

The BCMCS Parameter Reset information is BCMCS information from the BCMCS controller 60. This information is used to inform the access terminal 10 of a change in the broadcast channel information. Upon receiving a Broadcast Order Message including the BCMCS Parameter Reset information, the access terminal 10 accesses the BCMCS controller 60 and updates changed BCMCS information in case of necessity.

2) BCMCS Stop Information

The BCMCS Stop information is used to inform the access terminal 10 that all BCMCS services or at least one BCMCS service corresponding to a particular BCMCS Flow ID are not transmitted due to a failure of a broadcasting network or a BCMCS server. Upon receiving a Broadcast Order Message including the BCMCS Stop information, the access terminal 10 immediately stops receiving the BCMCS service corresponding to the BCMCS Flow ID, and accesses the BCMCS controller 60 and inquires about a change in BCMCS information in case of necessity.

3) BCMCS Unavailable Information

The BCMCS Unavailable information is used to inform the access terminal 10 that a BCMCS service corresponding to BCMCS Flow ID requested by the access terminal 10 is unavailable in the current access network 40. Upon receiving a Broadcast Order Message including the BCMCS Unavailable Information, the access terminal 10 stops receiving the BCMCS service corresponding to the BCMCS Flow ID, or accesses the BCMCS controller 60 and newly updates BCMCS information in case of necessity.

4) Broadcast Protocol Attribute Update Information

The Broadcast Protocol Attribute Update information is used to inform the access terminal 10 of a change in value of a protocol configuration attribute used by a BCMCS protocol. Upon receiving a Broadcast Order Message including the Broadcast Protocol Attribute Update information, the access terminal 10 sets up a traffic channel to the access network 40, and then updates a configuration attribute value through session configuration, or updates a changed configuration attribute value using Generic Attribute Update Protocol. Here, the attribute value can be an authentication key value for BCMCS authentication on the access terminal 10.

As the Broadcast Order Message is configured such that it can be transmitted not only on a unicast basis but also on a broadcast basis, all access terminals 10 can simultaneously receive the Broadcast Order Message.

When the Broadcast Order Message is used, the Broadcast Overhead Message used in the HRPD BCMCS system can be reduced in length such that it includes only the actually-transmitted BCMCS information. When the access terminal 10 requests BCMCS contents not included in the Broadcast Overhead Message by sending a corresponding BCMCS Flow ID, if the broadcasting network can transmit the BCMCS contents requested by the access terminal 10, it starts transmitting the corresponding BCMCS contents and includes channel information for the BCMCS contents in the Broadcast Overhead Message that is transmitted next. The access terminal 10, after requesting BCMCS contents, receives the corresponding BCMCS service after receiving the next Broadcast Overhead Message.

However, when the broadcasting network cannot transmit the BCMCS contents requested by the access terminal 10, the access network 40 transmits a Broadcast Order Message to the access terminal 10. Upon receiving the Broadcast Order Message, the access terminal 10 informs its user that the BCMCS service is stopped and/or the access terminal 10 should access the BCMCS controller 60 for updating changed BCMCS information. A format of the Broadcast Order Message proposed in the present invention is illustrated in Table 1.

TABLE 1

| | |
|---|---|
| MessageID | 8 |
| Order | 4 |
| BCMCSFlowIDLength | 0 or 2 |
| BCMCSFlowCount | 0 or 8 |
| BCMCSFlowCount + 1 occurrences of the following field BCMCSFlowID | |
| BCMCSFlowID | (BCMCSFlowIDLength + 1) × 8 |
| Reserved | 0-7 (as needed) |

In Table 1, a first field, an 8-bit "Message ID field," represents an identifier (ID) assigned to a corresponding Broadcast Order Message, and a second field, a 4-bit "Order field," represents a status of the broadcasting network, indicated by the Broadcast Order Message. An example of the Order field is illustrated in Table 2.

TABLE 2

| Value (binary) | Order | Usage |
|---|---|---|
| 0000 | BCMCSParametersReset | This order is used to indicate that BCMCS parameters are changed and the access terminal must refresh the parameters. |
| 0001 | BCMCSServiceStopped | This order is used to indicate that the broadcast service is stopped. |
| 0010 | BCMCSAllServicesStopped | This order is used to indicate that all broadcast services are stopped. |
| 0011 | BCMCSServiceUnavailable | This order is used to indicate that the broadcast service is unavailable. |
| 0100 | BCMCSProtocolAttributesUpdate | This order is used to indicate that the broadcast protocol attributes are changed and the access terminal must update the attributes. |
| 0101-1111 | Reserved | Reserved |

In Table 2, an Order field value "0000" (binary) indicates that BCMCS information from the BCMCS controller 60 is changed, and this value corresponds to the BCMCS Parameter Reset information. An Order field value "0001" (binary) indicates that a BCMCS service corresponding to the BCMCS Flow ID included in the Broadcast Order Message is stopped. An Order field value "0010" (binary) indicates that all BCMCS services available in the current access network or its subnetwork are stopped, and this value corresponds to the BCMCS Stop information.

An Order field value "0011" (binary) indicates that a BCMCS service corresponding to the BCMCS Flow ID included in the Broadcast Order Message is unavailable in the current access network or its subnetwork, and this value corresponds to the BCMCS Unavailable information. Finally, an Order field value "0100" (binary) indicates that a value of a configuration attribute for a broadcast or unicast protocol in used by an access terminal is changed.

Turning back to Table 1, a third field, a "BCMCSFlow-IDLength field," represents a length of BCMCS Flow ID included in the Broadcast Order Message. The BCMCS Flow ID has a length of "(value of BCMCSFlowIDLength field)+ 1" in a unit of byte. A fourth field, a "BCMCSFlowCount field," represents the number of BCMCS Flow IDs included in the Broadcast Order Message, and BCMCS Flow ID corresponding to a value of "(value of BCMCSFlowCount field)+1" is included in the Broadcast Order Message before being transmitted. A fifth field, a "BCMCSFlowID field", represents a value of BCMCS Flow ID included in the Broadcast Order Message. The BCMCSFlowIDLength, BCMCS-FlowCount, and BCMCSFlowID fields in the Broadcast Order Message of Table 1 are included only when the Order field value is "0001" (binary) or "0011" (binary) in Table 2.

An example of transmission characteristics of the Broadcast Order Message is illustrated in Table 3. As illustrated, the Broadcast Order Message is transmitted to the access terminal 10 over a forward traffic channel or a forward control channel on a unicast basis or on a broadcast basis. In addition, the Broadcast Order Message is transmitted by Signaling Link Protocol (SLP) only once, and it has the same transmission priority of 30 as the conventional Broadcast Reset Message. It should be noted that unlike the Broadcast Order Message, separate Order messages can be defined for respective fields of Table 2.

TABLE 3

| Channels | FTC | CC | | SLP | Best Effort |
|---|---|---|---|---|---|
| Channels | Broadcast | | Unicast | Priority | 30 |

Figure 2:
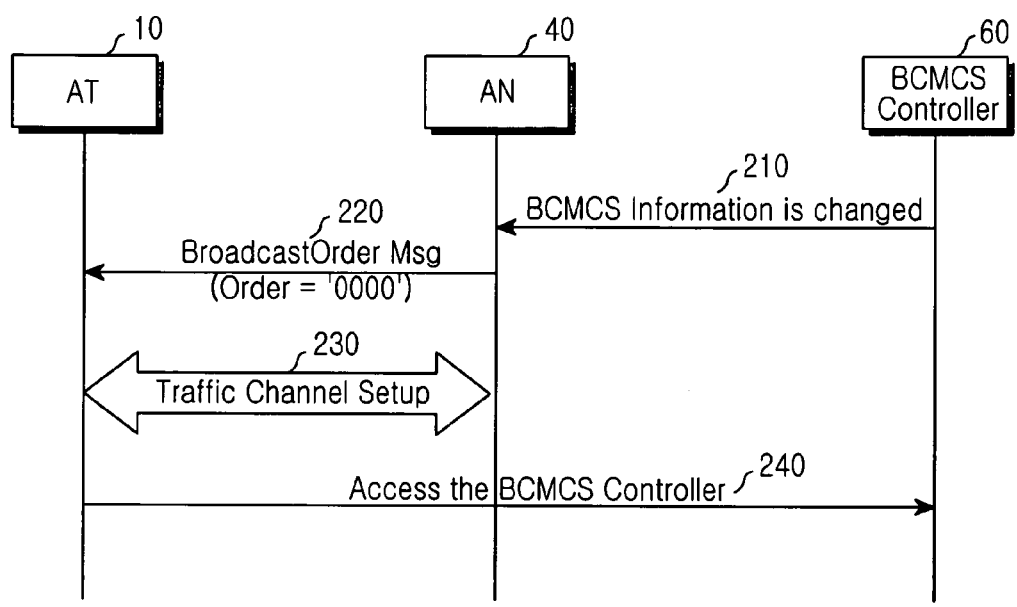
FIG. 2 is a flow diagram illustrating a procedure for processing a call using a Broadcast Order Message including BCMCS Parameter Reset information according to a first embodiment of the present invention.

FIG. 2 is a flow diagram illustrating a procedure for processing a call using a Broadcast Order Message including BCMCS Parameter Reset information according to the first embodiment of the present invention. In step 210, the access network 40 receives from the BCMCS controller 60 a message indicating that BCMCS information, or broadcast channel information, is changed for some reason. In step 220, the access network 40 transmits a Broadcast Order Message with an Order field="0000" (binary) indicating a "BCMCSParametersReset" status, to the access terminal 10. The access terminal 10 receiving the Broadcast Order Message recognizes the change in BCMCS information. In step 230, the access network 40 sets up a traffic channel to the access terminal 10. In step 240, the access terminal 10 accesses the BCMCS controller 60 and updates the changed BCMCS information.

Figure 3:
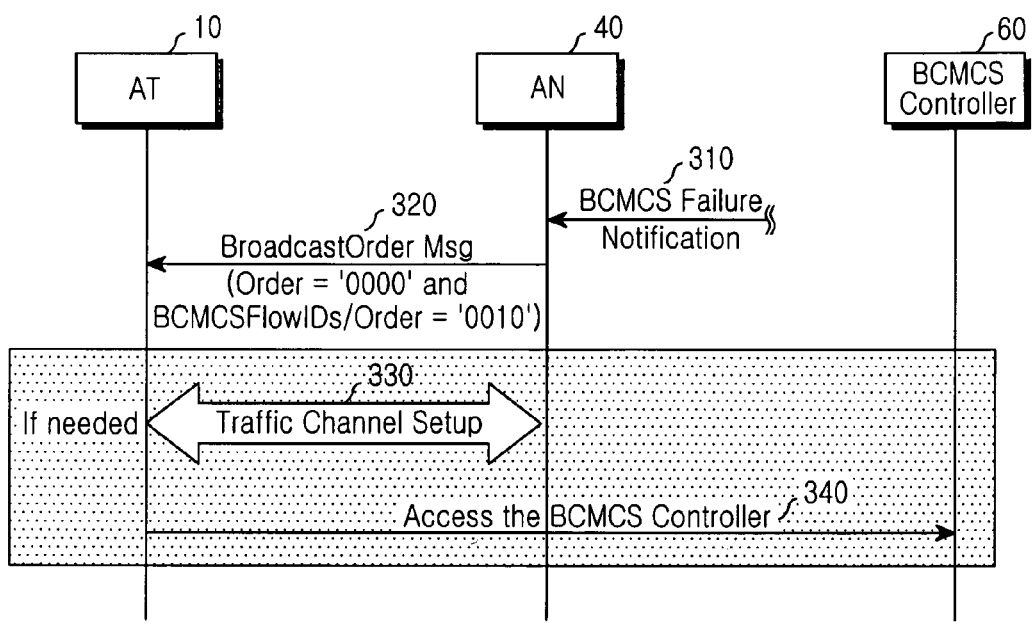
FIG. 3 is a flow diagram illustrating a procedure for processing a call using a Broadcast Order Message including BCMCS Services Stopped information according to a first embodiment of the present invention.

FIG. 3 is a flow diagram illustrating a procedure for processing a call using a Broadcast Order Message including BCMCS Services Stopped information according to the first embodiment of the present invention. In step 310, the access network 40 receives a notification message indicating a status in which a BCMCS service is stopped for some reason. Because the status where a BCMCS service is stopped may be caused by the access network 40 itself or a BCMCS content server 20 or a BCMCS controller 60 and so on, a transmission side is not specified in step 310. Thereafter, in step 320, the access network 40 transmits, to the access terminal 10, a Broadcast Order Message including an Order field="0001" (binary) indicating a "BroadcastServicesStopped" status where at least one_BCMCS service is not transmitted or an Order field="0010" (binary) indicating a status where all BCMCS services are not transmitted Thus, the access terminal 10 recognizes that BCMCS services included in the received Broadcast Order Message or all BCMCS services are currently not transmitted. Thereafter, in step 330, the access network 40 sets up a traffic channel to the access terminal 10 in case of necessity. In step 340, the access terminal 10 accesses a BCMCS controller 60 and updates the reason for the "BroadcastServicesStopped" status or the changed BCMCS information.

Figure 4:
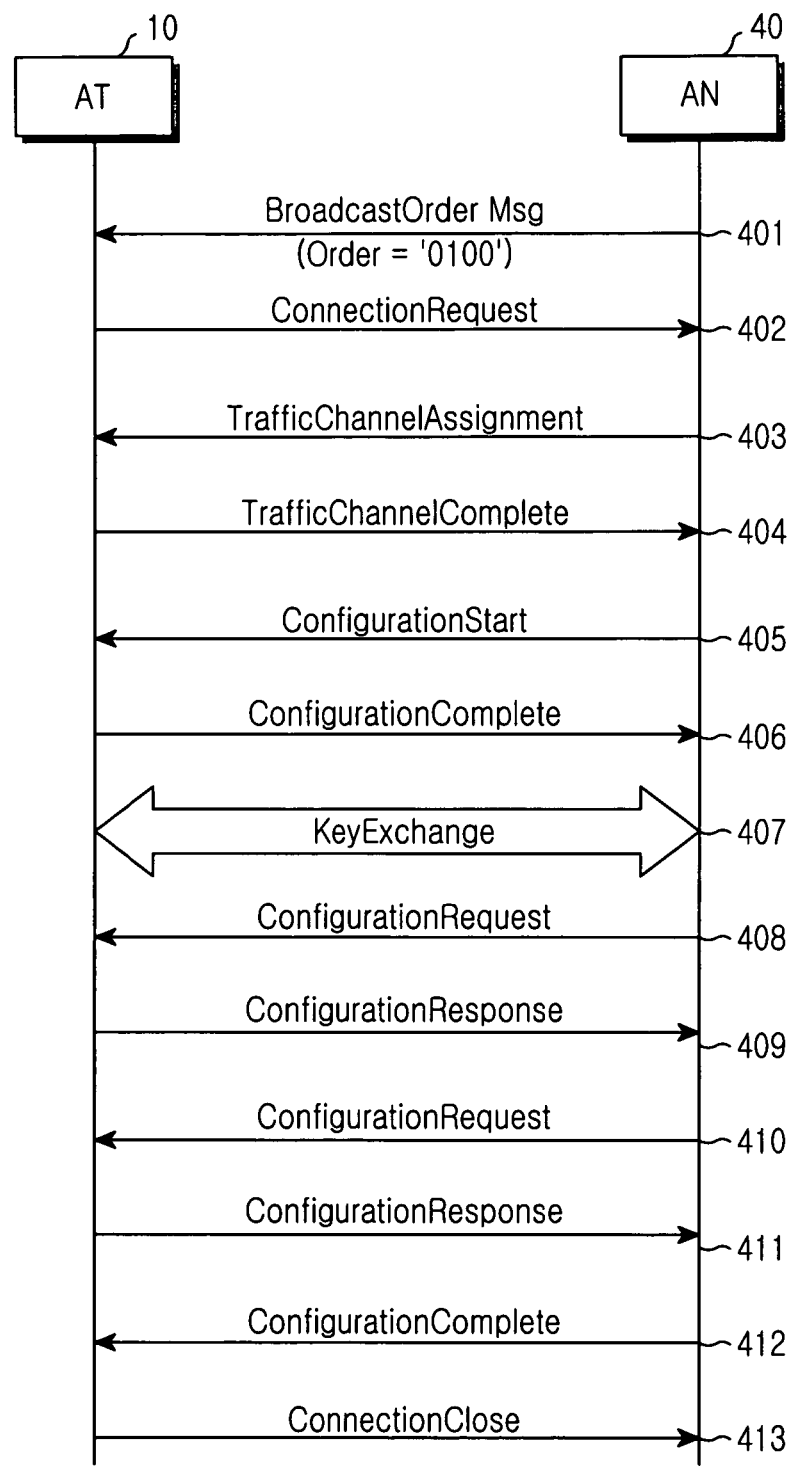
FIG. 4 is a flow diagram illustrating a procedure for processing a call using a Broadcast Order Message including Broadcast Protocol Attribute Update information according to a first embodiment of the present invention.

FIG. 4 is a flow diagram illustrating a procedure for processing a call using a Broadcast Order Message including Broadcast Protocol Attribute Update information according to the first embodiment of the present invention. In step 401, an access network 40 whose configuration attribute for a BCMCS service is changed, transmits, to the access terminal 10, a Broadcast Order Message including an Order field="0100" (binary)indicating the change in configuration attribute for a BCMCS service. In step 402, the access network 40 receives a Connection Request message from the access terminal 10 that received the Broadcast Order Message. In step 403, the access network 40 transmits a Traffic Channel Assignment message to the access terminal 10. In response, the access network 40 receives in step 404 a Traffic Channel Complete message from the access terminal 10 and sets up a traffic channel to the access terminal 10.

In step 405, the access network 40 whose traffic channel is set up to access the access terminal 10 sends a Configuration Start message so that the access terminal 10 starts a negotiation over a configuration attribute value. In the HRPD system, negotiation over the configuration attribute value is divided into two steps. That is, the negotiation is divided into an access terminal (AT) initiated status in which the access terminal 10 sends a request for a desired configuration attribute value to the access network 40 and the access network 40 responds thereto, and an access network (AN) initiated status in which the access network 40 sends a desired configuration attribute value to the access terminal 10 and the access terminal 10, responds thereto.

In step 406, the access network 40 receives a Configuration Complete message from the access terminal 10. Through the Configuration Complete message, the access network 40 skips the AT initiated status of the access terminal 10. In step 407, the access network 40 exchanges key information with the access terminal 10. Thereafter, the access network 40 transmits a Configuration Request message to the access terminal 10 in step 408, and receives a Configuration Response message from the access terminal 10 in step 409. Thereafter, the access network 40 transmits a Configuration Request message to the access terminal 10 in step 410, and receives a Configuration Response message from the access terminal 10 in step 411.

In this operation, the access network 40 exchanges the configuration attribute value changed in the AN initiated status with the access network 40. In the request and response process of steps 408 to 411, the access network 40 sends a request for the changed configuration attribute value to the access terminal 10. In response, the access terminal 10 accepts the changed configuration attribute value.

After completion of negotiation over all configuration attribute values, the access network 40 transmits (in step 412) a Configuration Complete message to the access terminal 10 to inform the access terminal 10 that the request for configuration attribute values of the access network 40 is completed. In the operation of steps 402 to 412, the access terminal 10 sets up a traffic channel and updates configuration attribute values. In step 413, the access network 40 receives from the access terminal 10 a Connection Close message indicating that the traffic channel is closed. Then the access terminal 10 resumes reception of the BCMCS service in the idle status.

Figure 5:
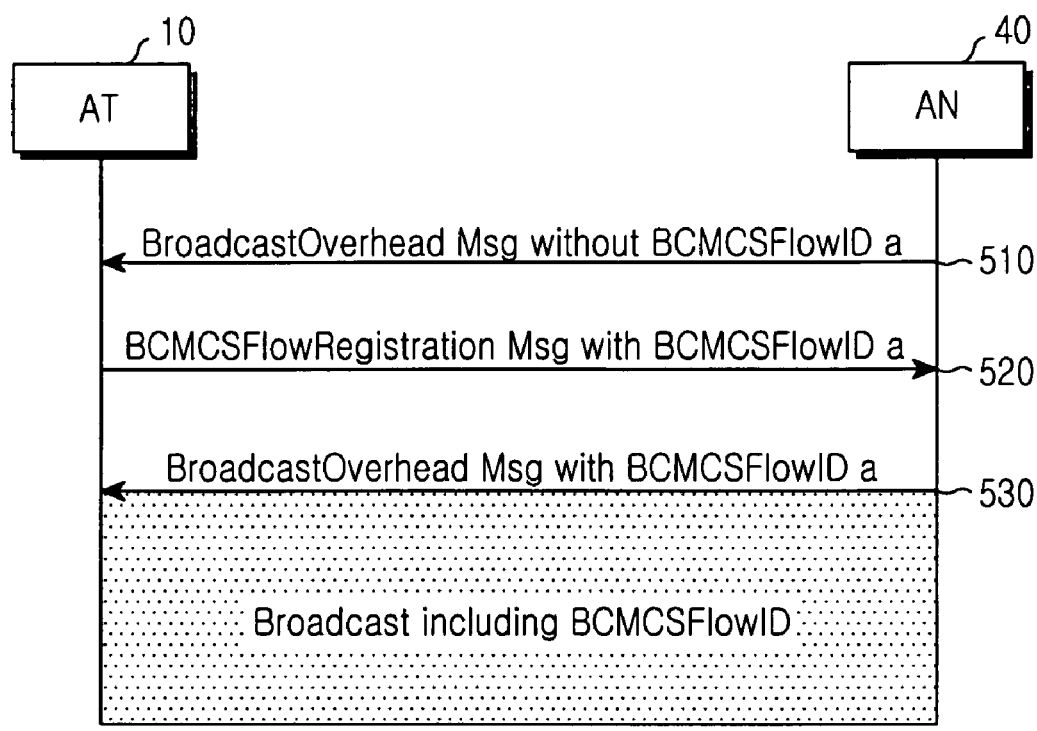
FIG. 5 is a flow diagram illustrating a procedure for processing a call using a Broadcast Overhead Message based on a Broadcast Order Message according to a first embodiment of the present invention.

FIG. 5 is a flow diagram illustrating a procedure for processing a call using a Broadcast Overhead Message based on a Broadcast Order Message according to the first embodiment of the present invention. In step 510, the access network 40 transmits, to the access terminal 10, a Broadcast Overhead Message including only BCMCS Flow IDs of currently-transmitted BCMCS services. Here, "BCMCSFlowID a" depicted in FIG. 5 means an identifier of a currently not provided BCMCS service from the access network 40. In step 520, the access network 40 receives a BCMCS Flow Registration message including BCMCS Flow ID (i.e. "BCMCS-FlowID a") of a desired BCMCS service from the access terminal 10 that wants to receive BCMCS services not included in the Broadcast Overhead Message In step 530, if the access network 40 can support a BCMCS service requested by the access terminal 10 after receiving the Registration message from the access terminal 10, the access network 40 starts transmission of the corresponding BCMCS service, and transmits a Broadcast Overhead Message including BCMCS Flow ID (i.e. "BCMCSFlowID a") and physical channel information for the corresponding BCMCS service to the access terminal 10. Then the access terminal 10 receiving the Broadcast Overhead Message acquires transmission information for the requested BCMCS service and receives the BCMCS service.

Figure 6:
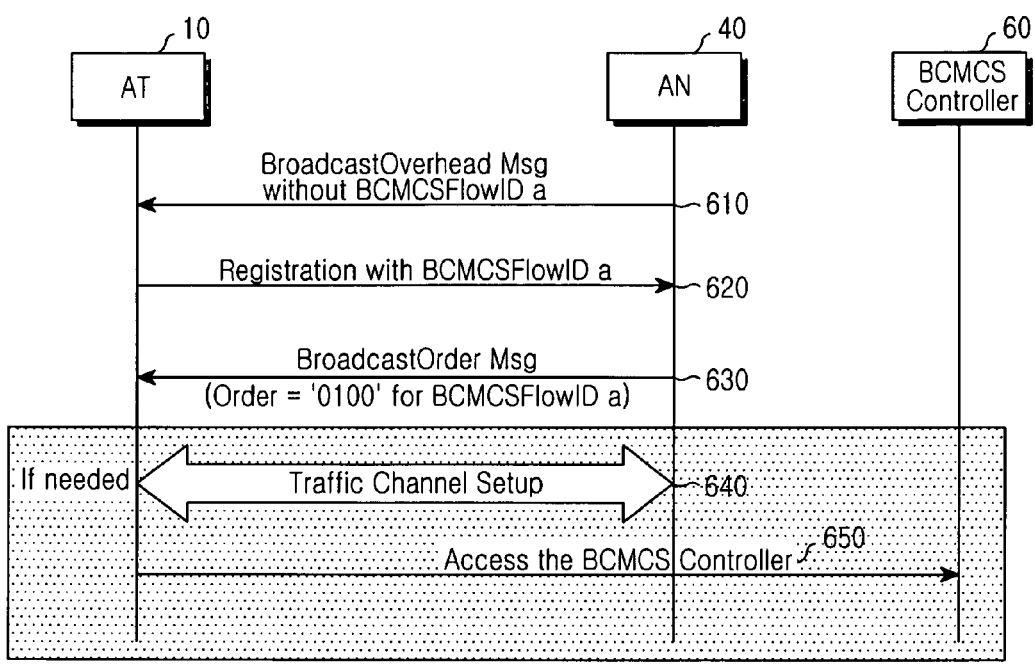
FIG. 6 is a flow diagram illustrating a procedure for processing a call using a Broadcast Order Message including BCMCS Unavailable information according to a first embodiment of the present invention.

FIG. 6 is a flow diagram illustrating a procedure for processing a call using a Broadcast Order Message including BCMCS Unavailable information according to the first embodiment of the present invention. In step 610, the access network 40 transmits, to the access terminal 10, a Broadcast Overhead Message including only BCMCS Flow IDs of currently-transmitted BCMCS services. In step 620, the access network 40 receives a Registration message including a BCMCS Flow ID (i.e. "BCMCSFlowID a") of a desired BCMCS service from the access terminal 10 that wants to receive BCMCS services not included in the Broadcast Overhead Message.

In step 630, the access network 40 analyzes the received Registration message and determines whether it can support a BCMCS service requested by the access terminal 10. If the access network 40 cannot support the requested BCMCS service, the access network 40 transmits, to the access terminal 10, Broadcast Order Message including an Order field="0011" (binary) indicating unavailability of the corresponding BCMCS service, and also including a BCMCS Flow ID of the corresponding BCMCS service. As a result, the access terminal 10 recognizes that the corresponding BCMCS service is unavailable. In step 640, the access network 40 sets up a traffic channel to the access terminal 10 in case it is needed by the access terminal 10. In step 650, the access terminal 10 accesses a BCMCS controller 60 and updates BCMCS information.

So far, the first embodiment of the present invention has been described with reference to a BCMCS method in an HRPD BCMCS system. Next, a second embodiment of the present invention will be described with reference to a BCMCS method in a 1x BCMCS system. Herein, the 1x BCMCS system refers to a CDMA 2000 1x Rev.A/B or 1x EV-DV (Evolution Data and Voice) system.

Figure 7:
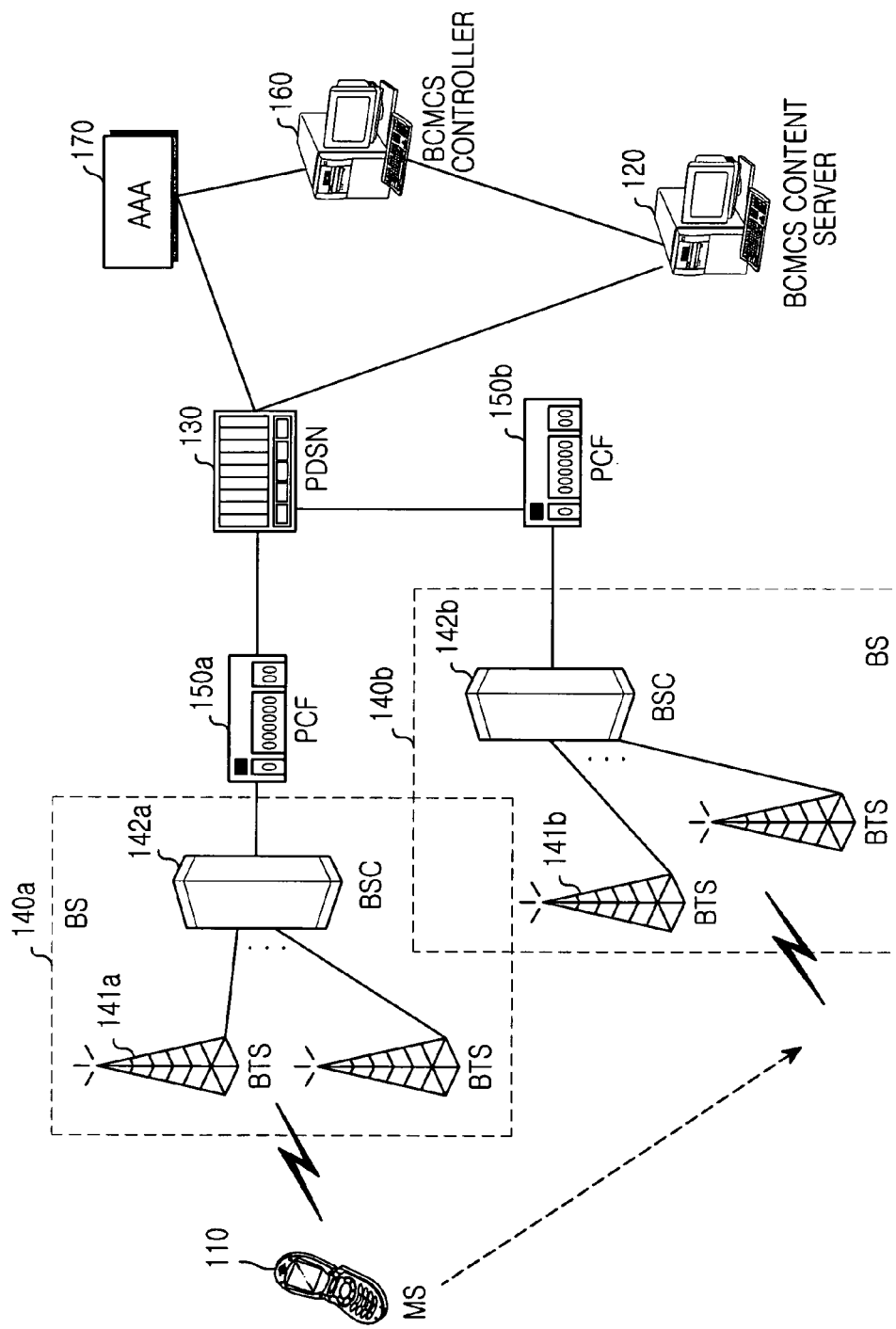
FIG. 7 is a diagram illustrating a structure of a 1x BCMCS system according to a second embodiment of the present invention.

FIG. 7 is a flow diagram illustrating a structure of a 1x BCMCS system according to a second embodiment of the present invention. A BCMCS system is defined as a broadcasting network that provides a BCMCS service through wireless communication with a plurality of mobile stations (MSs) 110. The broadcasting network can be roughly divided into a broadcasting service server or contents server (BCMCS content server) 120, a packet data service node (PDSN) 130, base stations (BSs) 140a and 140b, and a BCMCS controller 160.

The BCMCS content server 120 generates broadcast data including video and sound for the BCMCS service in the form of a compressed Internet Protocol (IP) packet. The generated IP packet is forwarded to the base stations 140 (i.e., 140a and 140b) via the packet data service node 130 through a packet communication network such as the Internet.

The base stations 140 include base transceiver systems (BTSs) 141a and 141b and base station controllers (BSCs) 142a and 142b (all of which are well known in the field of mobile communication technology), and packet control functions (PCFs) 150a and 150b are interconnected between the base stations 140 and the packet data service node (PDSN) 130. The PDSN 130 handles accounting and authentication processes for a user with an Authentication, Authorization and Accounting (AAA) server 170 for controlling accounting and broadcast authentication, and the BCMCS controller 160 is interconnected between the AAA server 170 and the BCMCS content server 120.

The 1x BCMCS system according to the present invention proposes a BCMCS Order Message (or a BCMCS Registration Reject Order Message). The BCMCS Order Message includes the following information according to its object. The information is identical to the information included in the Broadcast Order Message defined in the HRPD BCMCS system according to the first embodiment of the present invention.

Although the Broadcast Order Message used in the first embodiment and the BCMCS Order Message used in the second embodiment are separately defined, they are substantially identical to each other in function but differ in format.

That is, the BCMCS Order Message can include BCMCS Parameter Reset information, BCMCS Stop information, and BCMCS Unavailable information. In the following description, for convenience, all of the information status above will be referred to as "BCMCS Order information."

Like the Broadcast Order Message defined for the HRPD BCMCS system according to the first embodiment of the present invention, the BCMCS Order Message used in the 1x BCMCS system according to the second embodiment of the present invention is configured such that it can be transmitted not only over a forward dedicated signaling logical channel (F-DSCH), but also over a forward common signaling logical channel (F-CSCH), so that all mobile stations can simultaneously receive the BCMCS Order Message.

When the BCMCS Order Message is used, the Broadcast System Parameters Message (BSPM) used in the 1x BCMCS system can be reduced in length such that it includes only the actually-transmitted BCMCS information. When the mobile station 110 requests BCMCS contents not included in the BSPM by sending a corresponding BCMCS Flow ID, if the broadcasting network can transmit the BCMCS contents requested by the mobile station 110, it starts transmitting the corresponding BCMCS contents and includes channel information for the BCMCS contents in the BSPM transmitted next. The mobile station 110, after requesting BCMCS contents, receives the requested BCMCS service after receiving the next BSPM.

However, when the broadcasting network cannot transmit the BCMCS contents requested by the mobile station 110, the broadcasting network transmits a BCMCS Order Message including BCMCS Unavailable information to the mobile station 110. Upon receiving the BCMCS Order Message including the BCMCS Unavailable information, the mobile station 110 informs its user that the BCMCS service is stopped and inquires whether it should access the BCMCS controller 160. A format of the BCMCS Order Message is illustrated in Table 4.

TABLE 4

| f-csch Order | f-dsch Order | Oder Code, ORDER (binary) | Order Quallification Code, ORDQ (binary) | ACTION_ TIME can be specified | Additional Fields other than ORDQ | P_REV_ IN_USE | Name/Function |
|---|---|---|---|---|---|---|---|
| Y | Y | 100011 | 00000000 | N | N | ≧11 | BCMCS Order (indicates that the BCMCS Parameters are changed) |
| Y | Y | 100011 | 00000001 | N | Y | ≧11 | BCMCS Order (indicates that the broadcast service is stopped |
| Y | Y | 100011 | 00000010 | N | N | ≧11 | BCMCS Order (indicates that all broadcast services are stopped) |
| Y | Y | 100011 | 00000011 | N | Y | ≧11 | BCMCS Order (indicates that broadcast service is unavailable) |

All other codes are reserved.

In Table 4, the BCMCS Order information is defined in P_REV version 11 or higher, and is transmitted over a f-csch or a f-dsch with an Order Code "100011" (binary). BCMCS Order information with Order Code="100011" (binary) and ORDQ="00000000" (binary) indicates a change in BCMCS information, and BCMCS Order information with Order Code "100011" (binary) and ORDQ "00000010" (binary) indicates that all BCMCS services are stopped.

In addition, BCMCS Order information with Order Code="100011" (binary) and ORDQ="00000001" (binary) indicates that a particular BCMCS service is stopped, and this BCMCS Order information has the additional fields illustrated in Table 5.

TABLE 5

| | |
|---|---|
| ORDQ | 8 |
| NUM_BCMCS_SESSION | 6 |
| NUM_BCMCS_SESSION occurrences of the following variable length record: | |
| BCMCS_FLOW_ID_LEN_IND | 2 |
| BCMCS_FLOW_ID | 16, 24, 32 |
| Reserved | 0-7 (as needed) |

In Table 5, a first field, an 8-bit ORDQ field, has a value of "00000001" (binary), and a second field, a 6-bit NUM_BCMCS_SESSION field, represents the number of BCMCS sessions included in the BCMCS Order information. A third field, a 2-bit BCMCS_FLOW_ID_LEN_IND field, indicates a length of each BCMCS Flow ID, and a fourth field, a BCMCS_FLOW_ID field, indicates BCMCS Flow ID corresponding to a stopped BCMCS service.

The BCMCS_FLOW_ID field has a 16-bit length for BCMCS_FLOW_ID_LEN_IND field='00', a 24-bit length for BCMCS_FLOW_ID_LEN_IND field='01' (binary), and a 32-bit length for BCMCS_FLOW_ID_LEN_IND field='10' (binary). The BCMCS Order information of Table 5 includes as many BCMCS Flow IDs as NUM_BCMC-S_SESSION. In addition, BCMCS Order information with Order Code="100011" (binary) and ORDQ="00000011" (binary) indicates that a particular BCMCS service is unavailable, and this BCMCS Order information has the additional fields illustrated in Table 6 below.

TABLE 6

| | |
|---|---|
| ORDQ | 8 |
| NUM_BCMCS_SESSION | 6 |
| NUM_BCMCS_SESSION occurrences of the following variable length record: | |
| BCMCS_FLOW_ID_LEN_IND | 2 |
| BCMCS_FLOW_ID | 16, 24, 32 |
| Reserved | 0-7 (as needed) |

In Table 6, a first field, an 8-bit ORDQ field, has a value of "00000011" (binary), and a second field, a 6-bit NUM_BCMCS_SESSION field, represents the number of BCMCS sessions included in the BCMCS Order information. A third field, a 2-bit BCMCS_FLOW_ID_LEN_IND field, indicates a length of a BCMCS Flow ID for each BCMCS service, and a fourth field, a BCMCS_FLOW_ID field, indicates a BCMCS Flow ID corresponding to an unavailable BCMCS service. Here, the BCMCS_FLOW_ID field has a 16-bit length for BCMCS_FLOW_ID_LEN_IND field="00" (binary), a 24-bit length for BCMCS_FLOW_ID_LEN_IND field="01" (binary), and a 32-bit length for BCMCS_FLOW_ID_LEN_IND field="10" (binary). The BCMCS Order information of Table 6 includes as many BCMCS Flow IDs as NUM_BCMCS_SESSION.

It should be noted that separate Order messages can be defined for the above-described BCMCS Order Message according to the type and the use of the BCMCS Order Message.

Figure 8:
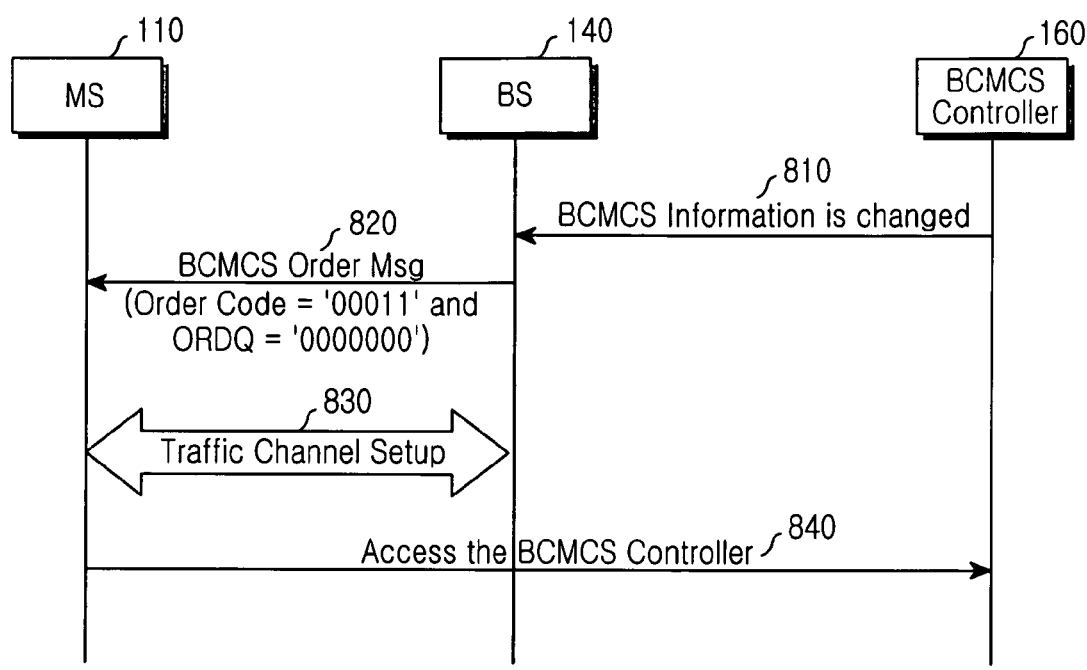
FIG. 8 is a flow diagram illustrating a procedure for processing a call using a BCMCS Order Message in the case where BCMCS information is changed according to a second embodiment of the present invention.

FIG. 8 is a flow diagram illustrating a procedure for processing a call using a BCMCS Order Message in the case where BCMCS information is changed according to a second embodiment of the present invention. In step 810, a base station 140 receives from a BCMCS controller 160 a message indicating that BCMCS information, or broadcast channel information, is changed for some reason. In step 820, the base station 140 transmits a BCMCS Order Message including BCMCS Order information with Order Code="100011" (binary) and ORDQ="00000000" (binary) in Table 4, to a mobile station 110. The mobile station 110 receiving the BCMCS Order Message recognizes the change in BCMCS information. In step 830, the base station 140 sets up a traffic channel to the mobile station 110. In step 840, the mobile station 110 accesses the BCMCS controller 160 and updates the changed BCMCS information.

Figure 9:
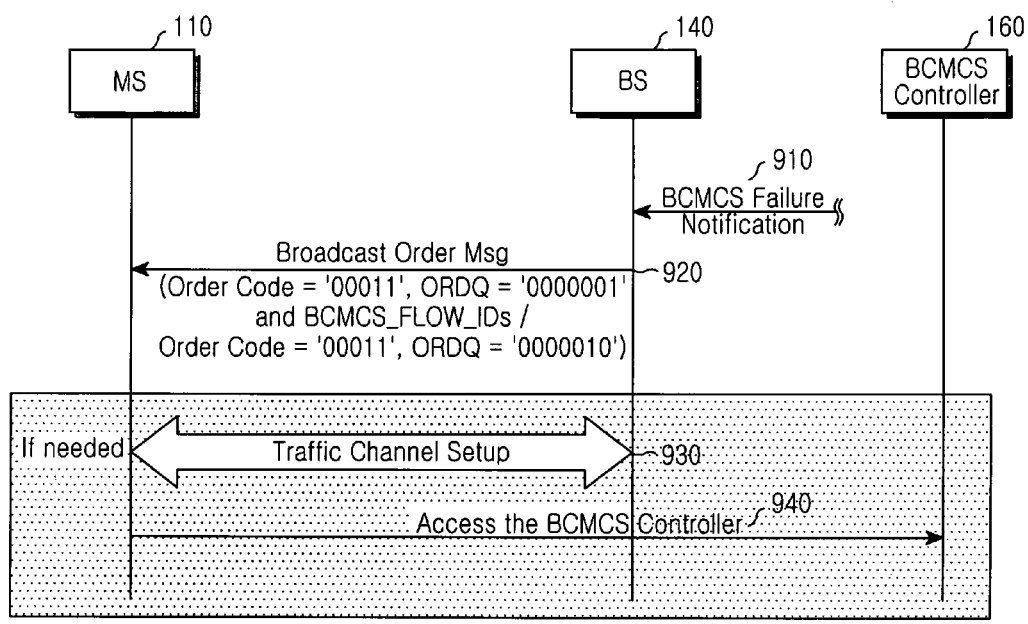
FIG. 9 is a flow diagram illustrating a procedure for processing a call using a BCMCS Order Message in the case where a BCMCS Service is stopped according to a second embodiment of the present invention.

FIG. 9 is a flow diagram illustrating a procedure for processing a call using the BCMCS Order Message in the case where a BCMCS Service is stopped, according to the second embodiment of the present invention. In step stopped, according to the second embodiment of the present invention. In step 910, the base station 140 receives a notification message indicating a status in which a BCMCS service is stopped for some reason. Otherwise the base station 140 recognizes the status caused by itself. Because the status where a BCMCS service is stopped may be caused by the base station 140 itself or the BCMCS content server 120 or the BCMCS controller 160 and so on, a transmission side is not specified in step 910. Thereafter, in step 920, the base station 140 transmits, to a mobile station 110, a BCMCS Order Message including BCMCS Order information with Order Code="100011" (binary) and ORDQ="00000001" (binary) indicating BCMCS Flow ID for a stopped BCMCS service or BCMCS Order information with Order Code="100011" (binary) and ORDQ="00000010" (binary) indicating unavailability of all BCMCS services.

Thus, the mobile station 110 receiving the BCMCS Order Message recognizes a that BCMCS services corresponding to BCMCS Flow IDs included in the received BCMCS Order Message, or that all BCMCS services, are unavailable. Thereafter, in step 930, the base station 140 sets up a traffic channel to the mobile station 110 in case it is needed by the mobile station 110. In step 940, the mobile station 110 accesses a BCMCS controller 160 and updates the reason why the BCMCS service is stopped or the changed BCMCS information.

Figure 10:
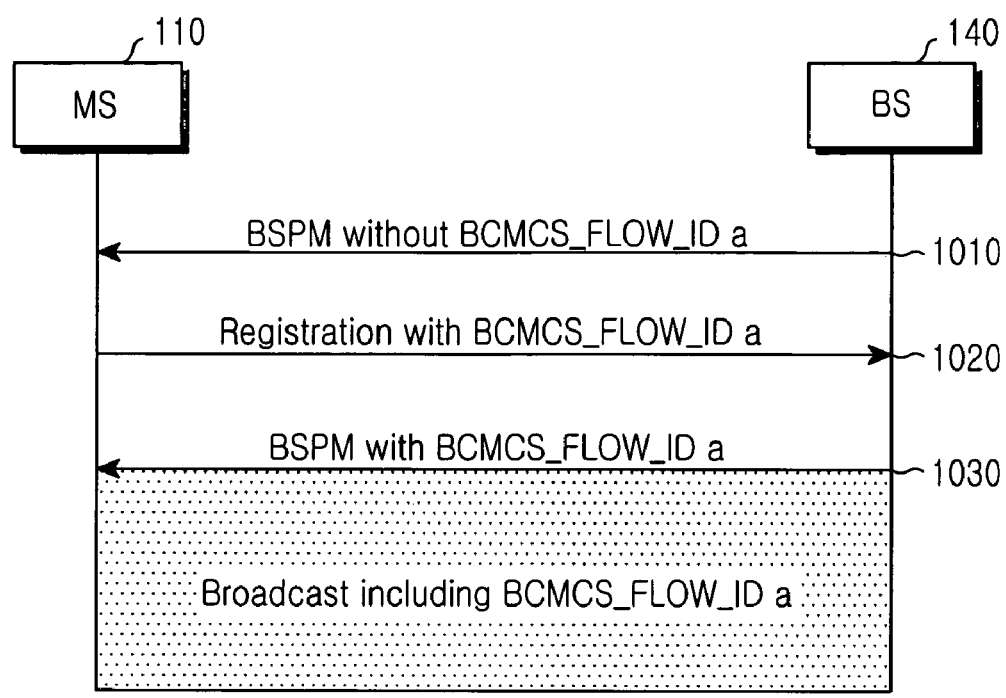
FIG. 10 is a flow diagram illustrating a procedure for processing a call in the case where a BSPM (Broadcast System Parameters Message) is transmitted to a mobile station and a base station can support a requested BCMCS service according to a second embodiment of the present invention.

FIG. 10 is a flow diagram illustrating a procedure for processing a call in the case where BSPM is transmitted to a mobile station and a base station can support a requested BCMCS service according to the second embodiment of the present invention. In step 1010, the base station 140 transmits, to the mobile station 110, BSPM including only BCMCS Flow IDs of currently-transmitted BCMCS services. In step 1020, the mobile station 110 desiring to receive a BCMCS service not included in the BSPM transmits a Registration message including BCMCS Flow ID of the desired BCMCS service to the base station 140. In step 1030, if the base station 140 receiving the Registration message can support the BCMCS service requested by the mobile station 110, it starts transmission of the corresponding BCMCS service and transmits BSPM including BCMCS Flow ID and physical channel information for the corresponding BCMCS service to the mobile station 110. Then the mobile station 110 receiving the BSPM acquires transmission information for the requested BCMCS service and receives the BCMCS service.

Figure 11:
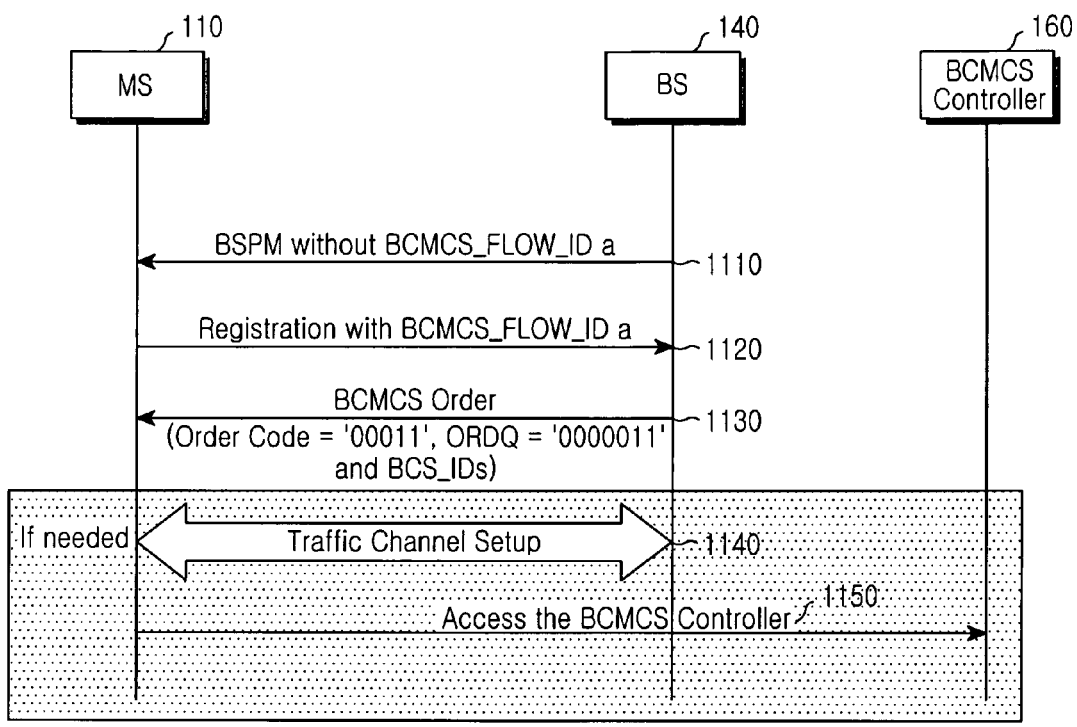
FIG. 11 is a flow diagram illustrating a procedure for processing a call in the case where no BSPM is transmitted to a mobile station and a base station cannot support a requested BCMCS service according to a second embodiment of the present invention.

FIG. 11 is a flow diagram illustrating a procedure for processing a call in the case where a BSPM is not transmitted to a mobile station and the base station cannot support a requested BCMCS service according to the second embodiment of the present invention. In step 1110, the base station 140 transmits, to the mobile station 110, a BSPM including only BCMCS Flow IDs of currently-transmitted BCMCS services. In step 1120, the mobile station 110 desiring to receive a BCMCS service not included in the BSPM sends a Registration message including BCMCS Flow ID of the desired BCMCS service to the base station 140. In step 1130, if the base station 140 receiving the Registration message cannot support the BCMCS service requested by the mobile station 110, it transmits, to the mobile station 110, BCMCS Order Message including BCMCS Order information with Order Code="100011" (binary) and ORDQ="00000011" (binary) including BCMCS Flow ID of the unavailable BCMCS service. As a result, the mobile station 110 recognizes that the corresponding BCMCS service is unavailable. In step 1140, the mobile station 110 sets up a traffic channel to the base station 140 in case of necessity. In step 1150, the mobile station 110 accesses a BCMCS controller 160 and updates the BCMCS information.

As can be understood from the foregoing description, in response to a BCMCS service request from a mobile station, a base station separately informs the mobile station whether the requested BCMCS service is available. Thus, the base station can include only broadcast channel information necessary for actual broadcast in a broadcasting overhead message, and if the BCMCS service is stopped or unavailable, the base station can order the mobile station to interrupt the BCMCS service, thereby increasing system efficiently by reducing the load on system resources.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for providing a Broadcast/Multicast Service (BCMCS) from a base station to a mobile station in a mobile communication system including a BCMCS content server for storing a plurality of BCMCS contents, a BCMCS controller connected to the BCMCS content server, and at least one mobile station located in an area occupied by the base station, the mobile station being connected to the BCMCS controller and a packet data service node (PDSN) via the base station, the method comprising the steps of:

receiving a BCMCS registration message from the mobile station; and transmitting a broadcast order message in response to the BCMCS registration message;

wherein the BCMCS registration message includes a BCMCS flow identifier (ID) indicating at least one BCMCS content, and the broadcast order message includes BCMCS Unavailable Information indicating that the at least one BCMCS content, requested by the mobile station, corresponding to the BCMCS flow ID is unavailable.

2. A method for providing status information on a status of a broadcasting network from a base station to a mobile station in a mobile communication system providing at least one Broadcast/Multicast Service (BCMCS), the method comprising the steps of:

recognizing the status of the broadcasting network; and transmitting a broadcast order message including the status information related to the status of the broadcasting network, the status of the broadcasting network indicating a reason for the at least one BCMCS not being received by the mobile station, wherein, when the status information represents BCMCS Unavailable Information indicating that the at least one BCMCS, corresponding to at least one BCMCS flow identifier (ID), requested by the mobile station is not available, the broadcast order message further includes the at least one BCMCS flow ID of the unavailable at least one BCMCS.

3. The method of claim 2, wherein when the status information is BCMCS Parameter Reset Information indicating a change in BCMCS information, the broadcast order message further includes at least one BCMCS flow ID of a corresponding BCMCS.

4. The method of claim 3, further comprising the steps of:
   accessing, by the mobile station, a BCMCS controller and updating changed BCMCS information, after recognizing the change in status of the broadcasting network.

5. The method of claim 2, wherein when the status information is BCMCS Stop Information indicating that a BCMCS corresponding to at least one BCMCS flow ID has not transmitted, the broadcast order message further includes the at least one BCMCS flow ID of the stopped BCMCS.

6. The method of claim 5, further comprising the steps of:
   stopping, by the mobile station, receiving the BCMCS corresponding to the BCMCS flow ID of the stopped BCMCS after recognizing the status of the broadcasting network.

7. The method of claim 1, further comprising the step of transmitting, by the mobile station, a registration message including a BCMCS flow ID of a desired BCMCS to the base station, before the recognizing step of the base station.

8. The method of claim 1, further comprising the step of accessing, by the mobile station, a BCMCS controller and updating BCMCS information after recognizing the status of the broadcasting network.

9. The method of claim 2, further comprising the step of updating, by the mobile station, configuration attribute value through a session configuration with the base station after recognizing the status of the broadcasting network when the status information represents Broadcast Protocol Attribute Update Information indicating a change in the configuration attribute value used for a BCMCS protocol.

10. The method of claim 2, further comprising the step of:
    updating, by the mobile station, configuration attribute value using an attribute update protocol after recognizing the status of the broadcasting network when the status information represents Broadcast Protocol Attribute Update Information indicating a change in the configuration attribute value used for a BCMCS protocol.

11. The method of claim 9, wherein the configuration attribute value includes an authentication key value for BCMCS authentication on the mobile station.

12. The method of claim 2, wherein the mobile communication system is a high-rate packet data (HRPD) system.

13. The method of claim 12, wherein the broadcast order message is transmitted over any one of a forward traffic channel and a forward control channel.

14. The method of claim 12, wherein the broadcast order message includes a message ID field, an information field indicating the status of the broadcasting network, and a BCMCS flow ID field of a corresponding BCMCS.

15. The method of claim 2, wherein the mobile communication system is a CDMA 2000 1x system.

16. The method of claim 15, wherein the broadcast order message is transmitted over any one of a forward dedicated signaling logical channel (F-DSCH) and a forward common signaling logical channel (F-CSCH).

17. The method of claim 2, wherein the broadcast order message is a message transmitted on a broadcast basis.

18. The method of claim 2, wherein the broadcast order message is a message transmitted on a unicast basis.

19. The method of claim 2, wherein the mobile station sets up a traffic channel to the base station if it is determined from the received broadcast order message that an update of BCMCS information is required.

20. The method of claim 2, further comprising the step of:
    transmitting by the base station a broadcast system parameters message (BSPM) including only BCMCS flow IDs of the currently-transmitted BCMCSs, to the mobile station.

21. A mobile communication system for providing status information on a status of a broadcasting network from a base station to a mobile station while providing a Broadcast/Multicast Service (BCMCS), the system comprising:
    the base station for transmitting a broadcast order message including the status information indicating the status of the broadcasting network, the status information indicating a reason for at least one BCMCS not being received by the mobile station, upon recognizing the status of the broadcasting network; and
    the mobile station for receiving the broadcast order message while using a BCMCS, and recognizing the status of the broadcasting network,
    wherein when the status information represents BCMCS Unavailable Information indicating that the at least one BCMCS, corresponding to at least one BCMCS flow identifier (ID), requested by the mobile station is not available, the broadcast order message further includes the at least one BCMCS flow ID of the unavailable at least one BCMCS.

22. The mobile communication system of claim 21, wherein the status information further represents BCMCS Stop Indicating Information that a BCMC corresponding to at least one BCMCS flow identifier (ID) has not transmitted.

23. The mobile communication system of claim 21, wherein when the status information represents Broadcast Protocol Attribute Update Information indicating a change in a configuration attribute value used for a BCMCS protocol, the configuration attribute value includes an authentication key value for BCMCS authentication on the mobile station.

* * * * *